April 9, 1963 E. S. RODRIGUEZ 3,084,968
BATTERY CARRIERS
Filed Sept. 18, 1961

ENOS S. RODRIGUEZ
INVENTOR.

3,084,968
BATTERY CARRIERS
Enos S. Rodriguez, 906 Intervale Ave., Bronx, N.Y.
Filed Sept. 18, 1961, Ser. No. 138,661
1 Claim. (Cl. 294—92)

This invention relates to battery carriers, and it comprises a handle, two flexible loops extending from said handle, and a gripping device on each of said loops, each of said gripping devices comprising a pair of blades, a hinge connecting said blades, a hole in each of said blades remote from said hinge, a notch in each of said blades remote from said hinge and said hole, said notches facing each other, each of said flexible loops passing through the said holes in the blades of one of said gripping devices, all as more fully described hereinafter and as claimed.

The objects of this invention are to provide a novel carrier for storage batteries which is compact and may be stored in a small space or carried in one's pocket, which grips a battery securely yet may be disconnected from the battery with ease, which permits the user to carry a battery for a considerable distance in relative comfort, and which may be manufactured economically.

The manner in which these objects are achieved is shown in the accompanying drawings in which.

Figure 1:
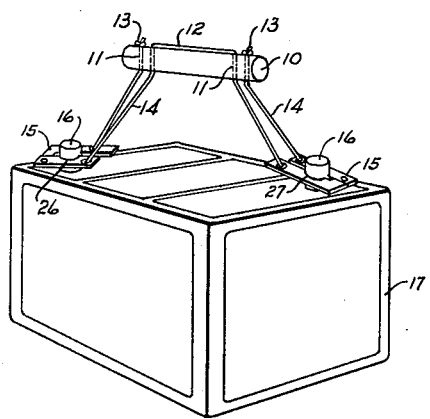
FIG. 1 shows a battery carrier, according to my invention, fitted to a storage battery.

Referring now to FIG. 1, my novel battery carrier has a handle 10 provided with holes 11 through which passes a flexible tension means 12 secured by knots 13 and forming a pair of loops 14 extending from the handle 10, as shown. On each flexible loop 14 is hung a gripping device 15 adapted to grip a terminal 16 of a battery 17.

Figures 2, 3:
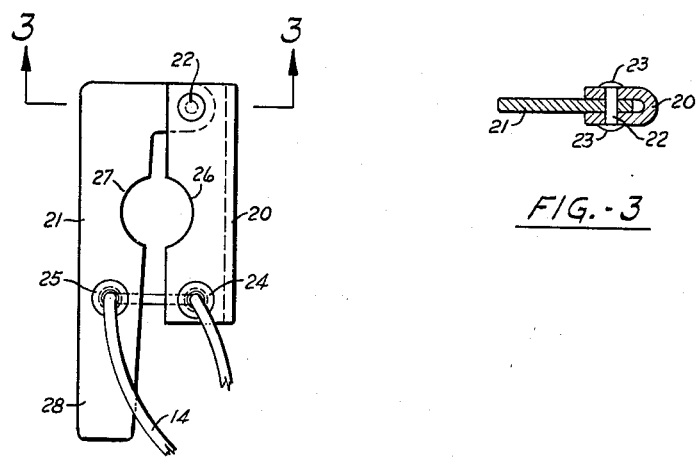
FIG. 2 is a view, on an enlarged scale, of one of the gripping devices of the battery carrier shown in FIG. 1.
FIG. 3 is a view in cross-section, taken along lines 3—3 of FIG. 1.

One of the two gripping devices 15 is shown in greater detail in FIGS. 2 and 3. It comprises a pair of blades 20 and 21. The blade 20 is shaped in the form of a channel (see FIG. 3) into which the other blade 21 is adapted to fit. A pin 22 passes through blade 20 and a portion of blade 21 located in the channel of blade 20. The pin 22 is riveted over at both ends, as shown at 23, and forms a hinge connecting the blades 20 and 21.

Each of the blades 20 and 21 has a hole fitted with a grommet 24 and 25, respectively. The blade 20 has a notch 26, and the blade 21 has a notch 27, the notches 26 and 27 facing each other. As shown in FIG. 2 the depth of the notches 26 and 27 is less than half their width. The blade 21 also has advantageously an extension 28.

In the assembled battery carrier each of the flexible loops 14 passes through the grommets 24 and 25 of one of the gripping devices 15. The grommets 24 and 25 are advantageous because they permit the tension means 12 of flexible loops 14 to slide in them freely and without chafing. In using my novel battery carrier the gripping devices 15 are placed over the terminals 16 of the battery 17 so that the notches 26 and 27 hug the terminals 16. When the battery carrier is then lifted by the handle 10, the loops 14 pull the blades 20 and 21 toward each other so that the terminals 16 are gripped firmly therebetween. When the battery is again set down and the pull on handle 10 is released, it is only necessary to lightly push the extension 28 in such manner that the blade 21 is swung away from blade 20. This releases the grip, and the battery carrier may be removed from the battery 17.

The handle 10 may be made of metal, wood or a suitable plastic. The tension means 12 may be a wire rope, a plastic monofilament made, for example, from polyethylene, or a rope made from suitable fibres, such as nylon or glass. The gripping devices 15 may be made from steel stampings or molded from a suitable plastic as, for instance, fibre re-inforced polyester or epoxy, or the like. In choosing the materials of construction use of all metal must, however, be avoided as this would result in a short circuit between the battery terminals to which the battery carrier is attached. Thus, either the tension means 12 or the gripping devices 15 should be made of non-metallic, electrically non-conductive material.

While I have shown and described what I consider the preferred form of my invention, modifications may be made without departing from its spirit, and reference is, therefore, made to the following claim for a definition of the scope of my invention.

What I claim is:

A battery carrier comprising a handle, a pair of flexible loops secured to and extending from said handle, and a separate gripping device on each of said loops adapted to grip a terminal of a battery, each of said gripping devices comprising one flat blade and another substantially flat blade shaped in the form of a channel open at one side that is adjacent said other blade, a portion of said one blade extending through said open side into said channel, a single hinge pin in each gripping device extending at right angles through said blades and passing through said portion, a notch in said open side, another notch in one side of said one blade facing said first named notch, each of said notches having a depth smaller than half its width, both said notches forming an opening having an axis parallel to the axis of said hinge pin, and a hole in each of said blades remote from said hinge pin, each of said flexible loops passing through the said holes in the said blades of the respective gripping device.

References Cited in the file of this patent

UNITED STATES PATENTS

| | | |
|---|---|---|
| 1,893,971 | Terrill | Jan. 10, 1933 |
| 2,357,129 | Perlman | Aug. 29, 1944 |
| 2,359,539 | Dechar | Oct. 3, 1944 |
| 2,442,249 | Schultz | May 25, 1948 |